(12) United States Patent
Preller et al.

(10) Patent No.: US 12,108,693 B2
(45) Date of Patent: Oct. 8, 2024

(54) AGRICULTURAL ROW UNIT FOR FIELD CULTIVATION

(71) Applicant: CNH Industrial America LLC, New Holland, PA (US)

(72) Inventors: William E. Preller, Congerville, IL (US); Eric C. Ragar, Delavan, IL (US); Michael J. Grossen, Peoria, IL (US)

( * ) Notice: Subject to any disclaimer, the term of this patent is extended or adjusted under 35 U.S.C. 154(b) by 0 days.

(21) Appl. No.: 18/210,883

(22) Filed: Jun. 16, 2023

(65) Prior Publication Data
US 2023/0329136 A1 Oct. 19, 2023

Related U.S. Application Data

(63) Continuation of application No. 16/849,820, filed on Apr. 15, 2020, now Pat. No. 11,716,917.

(60) Provisional application No. 62/834,000, filed on Apr. 15, 2019.

(51) Int. Cl.
| | |
|---|---|
| A01B 49/02 | (2006.01) |
| A01B 5/06 | (2006.01) |
| A01B 17/00 | (2006.01) |
| A01B 27/00 | (2006.01) |
| A01B 49/06 | (2006.01) |
| A01C 5/06 | (2006.01) |
| A01C 7/08 | (2006.01) |

(52) U.S. Cl.
CPC ............. A01B 49/02 (2013.01); A01B 5/06 (2013.01); A01B 17/00 (2013.01); A01B 27/005 (2013.01); A01C 5/064 (2013.01); A01C 5/068 (2013.01); A01B 49/06 (2013.01); A01C 7/08 (2013.01)

(58) Field of Classification Search
CPC ........... A01B 49/02; A01B 49/06; A01B 5/06; A01B 17/00; A01B 27/005; A01C 5/064; A01C 5/068; A01C 7/08
See application file for complete search history.

(56) References Cited

U.S. PATENT DOCUMENTS

| | | |
|---|---|---|
| 5,934,382 A | 8/1999 | Wilkins |
| 2014/0166321 A1 | 6/2014 | Hurd |

*Primary Examiner* — Tara Mayo
(74) *Attorney, Agent, or Firm* — Rebecca Henkel; Peter K. Zacharias; Rickard K. DeMille

(57) ABSTRACT

An agricultural row unit assembly includes a prefracture coulter positioned along a center axis of the row unit assembly and a seedbed cultivator positioned along the center axis of the row unit assembly at a location aft of the prefracture coulter. The row unit assembly also includes a rolling cultivator positioned aft of both the prefracture coulter and the seedbed cultivator, the rolling cultivator rotating about a shaft, the shaft extending between first and second ends. Additionally, the row unit assembly includes first and second gauge wheels, with the first gauge wheel being coupled to the first end of the shaft and the second gauge wheel being coupled to the second end of the shaft.

14 Claims, 3 Drawing Sheets

AGRICULTURAL ROW UNIT FOR FIELD CULTIVATION

CROSS-REFERENCE TO RELATED APPLICATIONS

This application is a continuation of U.S. patent application Ser. No. 16/849,820, filed Apr. 15, 2020, which, in turn, claims priority benefits from U.S. provisional patent application No. 62/834,000 filed on Apr. 15, 2019, entitled "Agricultural Row Unit for Field Cultivation", both of which are hereby incorporated by reference herein in their its entirety for all purposes

FIELD OF THE INVENTION

The present invention relates generally to a row unit for preparing a field for planting and more particularly to soil preparation for opportune planting.

In the agricultural industry, seed planting is a key characteristic in harvesting the needed bushels per acre to sustain working farms. Traditionally, the land is either completely tilled for seed planting or not tilled. With tilling, the ground being cultivated is completely worked and is less opportune for planting since tilling relies on months of time to compress and even out the soil before seed can be planted. With no till, as the term indicates, the ground isn't cultivated prior to seed planting. It has become more common to till rows for seed planting at a reduce cost of tilling the entire field.

One problem with tilling is relying on nature to consistently prepare the soil from the time the ground is tilled to the time of planting the seed. At the time of seed planting, the level of re-firming and presence of air pockets varies based on natural occurrences and ground unevenness, and leads to less than desired seed planting soil characteristics. With different re-firming levels, there can be air pockets in the soil that are detrimental to seed propagation after planting which leads to less than desired growth or even non-propagation. Air pockets in the soil can inhibit the seed from growing into the optimal plant to be harvested, such as, soybean, wheat, corn, rye, and the like. After seed planting, ground unevenness can cause water runoff providing less than optimal soil moisture for seed propagation.

Another problem with tilling is the inefficiency of tilling the entire field instead of tilling a row based on the type of seed being planted. The additional cost of operating additional row units to till portions of the field not necessarily corresponding to seed planting adds cost, time, and wear to field cultivation equipment.

Yet another problem, no tilling adds additional requirements for planting seeds. Without tilling, one has additional matter in the soil that may impair the planting of seeds. In the case of corn planting and harvesting, one encounters stalks in the soil at the time of seed planting. In this case the row unit has to overcome additional forces to open up the soil for seed planting. To overcome field debris a tractor needs higher power capability which impacts cost and wear of components to cultivate the field.

SUMMARY OF THE INVENTION

Shortcomings of prior row unit assemblies for cultivating a row of soil can be overcome by a pair of tine assemblies wherein each has at least one tine mounted to a hub and the hub is adapted to rotate about a first axis. Rotation of the pair of tine assemblies fractures soil and forms a pair of outer edges of a tilled row. A rolling cultivator adapted to treat soil being ripped and fractured and form a generally flat profile to the tilled row.

In some embodiments, soil preparation for opportune planting involves using a row unit assembly wherein at least one row unit has a pair of row cleaners, a pre-fracture coulter, a pair of tine assemblies, a seedbed cultivator, a pair of closing coulters, a rolling cultivator, and a pair of gauge wheels. In some embodiments, the at least one row unit is adapted to mount to a toolbar. In some embodiments, the at least one row unit forms a tilled row for planting and the at least one row unit is removable from the toolbar. In some embodiments, at least one planter replaces the at least one row unit. In some embodiments, the at least one planter has a supply of seed adapted to be dispersed below ground level of the soil and generally in the tilled row.

In some embodiments, a row unit assembly for cultivating a row of soil includes: a pair of tine assemblies each having at least one tine mounted to a hub, the hub adapted to rotate about a first axis, whereby rotation of the pair of tine assemblies fractures soil and forms a pair of outer edges of a tilled row; a rolling cultivator adapted to treat soil being ripped and fractured and form a generally flat profile to the tilled row.

In some embodiments, the pair of tine assemblies has a width in the range of 8" to 12" (20.3 cm to 30.5 cm). In some embodiments, each of the pair of tine assemblies has a predetermined depth in the soil of less than or equal to 6" (15.2 cm). In some embodiments, at least one tine has an outer diameter of rotation and defines a horizontal plane parallel to the first axis, and the outer diameter is positioned in the range of 0 degrees to 5 degrees from the horizontal plane. In some embodiments, at least one tine has an outer diameter of rotation and generally defines a second vertical plane perpendicular with the first axis, and the outer diameter being positioned in the range of 0 degrees to 4 degrees from the second vertical plane.

In some embodiments, at least one tine is a pair of tines and spacing between the pair of tines is in the range of 6" to 12" (15.2 cm to 30.5 cm).

In some embodiments, at least one tine is configured with six tines.

In some embodiments, the rolling cultivator is position centrally with a center axis, the rolling cultivator forming a pair of spider configurations about the center axis.

In some embodiments, the pair of spider configurations works the soil towards the center axis of the tilled row.

In some embodiments, the rolling cultivator is set at a depth corresponding to the planting of seed. In some embodiments, the depth being is in the range of 0.5" to 2.5" (1.3 cm to 6.4 cm). In some embodiments, the rolling cultivator has a width in the range of 10" to 11" (25.4 cm to 27.9 cm). In some embodiments, the rolling cultivator and the first axis have a predetermined length in the range of 39" to 42" (99 cm to 106.7 cm).

In some embodiments, the row unit assembly includes a pre-fracture coulter positioned along a center axis and forward of the rolling cultivator.

In some embodiments, the pre-fracture coulter defines a soil fracture point and has a pair of row cleaners, the pair of row cleaners each defining an outer diameter, and each of the pair of row cleaners positioned relative to the pre-fracture coulter with the outer diameter adjacent the soil fracture point.

In some embodiments, the row unit assembly includes a pair of closing coulters each being positioned outwardly of the pair of tine assemblies. In some embodiments, the pair of closing coulters are angled. In some embodiments, the pair of closing coulters is angled in a range of zero degrees to 5 degrees relative to a center axis. In some embodiments, each of the pair of closing coulters has an outer diameter adjacent to the hub. In some embodiments, each of the pair of closing coulters maintains the fractured soil between each of the pair of closing coulters. In some embodiments, each of the pair of closing coulters directs the fractured soil towards the center of the row being tilled.

In some embodiments, the rolling cultivator rotates about a shaft and a pair of gauge wheels is fastened to each end of the shaft. In some embodiments, the pair of gauge wheels have a diameter in the range of 11" to 12" (27.9 cm to 30.5 cm).

In some embodiments, the row unit assembly includes a seedbed cultivator adapted to work through the soil, the tilled row generally defining a center axis and the seedbed cultivator generally coincident with the center axis during cultivation. In some embodiments, the seed seedbed cultivator is a shank. In some embodiments, the seedbed cultivator is a disk. In some embodiments, the seedbed cultivator has a wavy profile.

In some embodiments, a method of soil preparation for opportune planting involves using a row unit assembly including at least one row unit having a pair of row cleaners, a pre-fracture coulter, a pair of tine assemblies, a seedbed cultivator, a pair of closing coulters, a rolling cultivator, and a pair of gauge wheels, the at least one row unit adapted to being mounted to a toolbar, the at least one row unit forming a tilled row for planting, and the at least one row unit being removable from the toolbar.

In some embodiments, at least one planter replaces at least one row unit. In some embodiments, the planter has a supply of seed adapted to be dispersed below ground level of the soil and in the tilled row.

In some embodiments, the pair of tine assemblies form outer edges of the tilled row.

In some embodiments, the pair of closing coulters maintain the fractured soil between each of the pair of closing coulters.

In some embodiments, the fractured soil transitions toward a center line of the tilled row.

In some embodiments, the rolling cultivator is adapted to re-firm the soil of the tilled row.

In some embodiments, the re-firming provides a relative flat profile to the ground profile.

DETAILED DESCRIPTION OF ILLUSTRATIVE EMBODIMENT(S)

Figure 1:
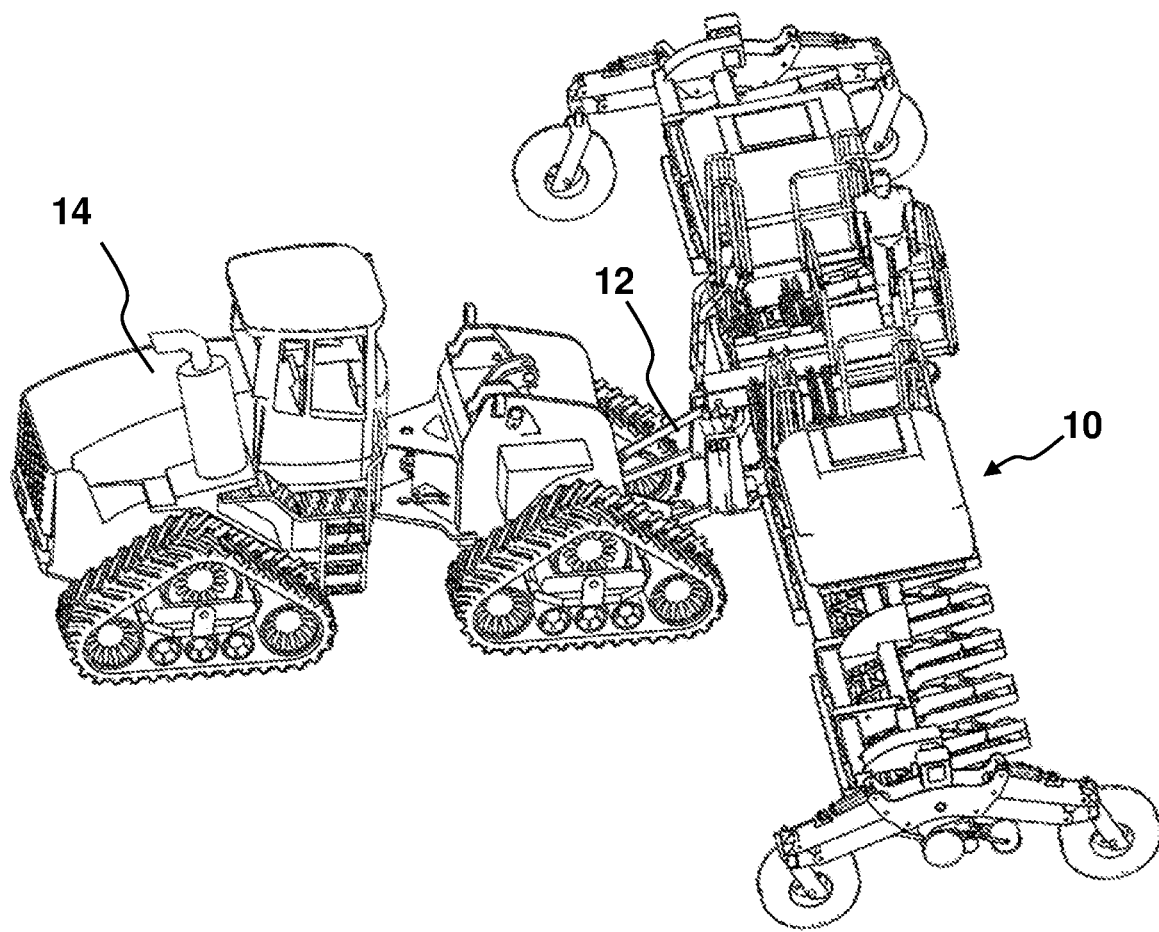
FIG. 1 is a perspective view of an agricultural row unit for use with a tractor.

Turning to the drawings and particularly to FIG. 1, which is a perspective view of row unit assembly 10 for use with toolbar 12 that is attached to tractor 14. As the tractor traverses a field, row unit assembly 10 prepares the field for seed planting. In at least some embodiments, one of the benefits of utilizing row unit assembly 10 is the ability to quickly transition from cultivating soil for chemical/fertilizer placement, and/or seed planting as compared to other tilling practices.

Figure 2:
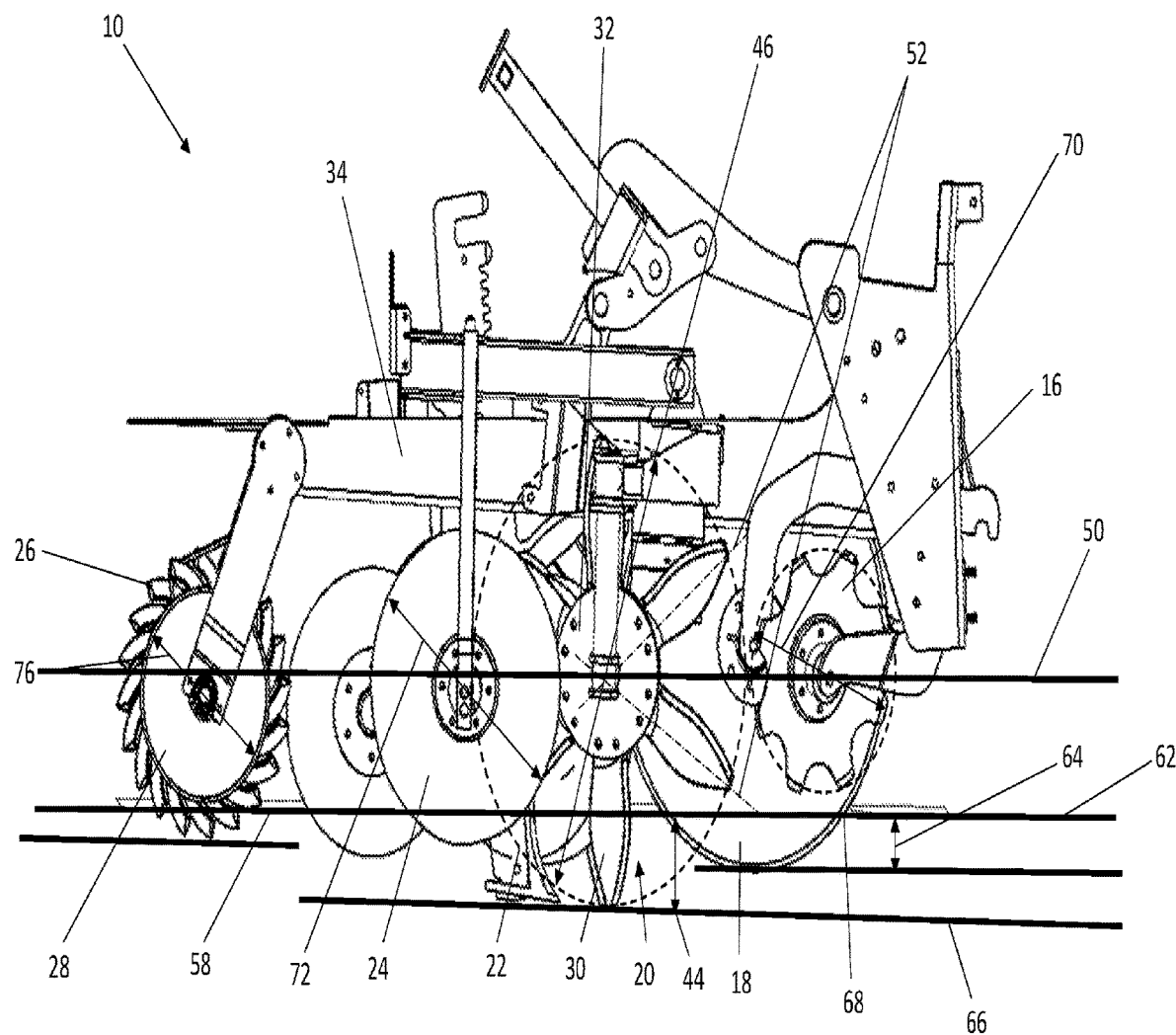
FIG. 2 is a side view of an agricultural row unit.

As shown in FIG. 2, row unit assembly 10 can include a pair of row cleaners 16, pre-facture coulter 18, pair of tine assemblies 20, seedbed cultivator 22, pair of closing coulters 24, rolling cultivator 26, and/or a pair of gauge wheels 28. In at least some embodiments, row unit assembly 10 provides fracturing of the soil by utilizing pre-fracture coulter 18 and the pair of tine assemblies 20 for ripping and or slicing a path of soil for proper seed planting. In addition, in at least some embodiments, row unit assembly 10, provides final preparation of the fractured, sliced, and/or ripped soil by utilizing the pair of closing coulters 24 and rolling cultivator 26. In at least some embodiments, row unit assembly 10 allows for cultivation in even the most difficult soil, such as clay, with desired seed planting.

Referring to FIG. 2, the pair of tine assemblies 20 is shown in one embodiment for fracturing the soil. In some embodiments, each of the pair of tine assemblies 20 has at least one tine 30 that is adapted to fracture the soil. Fracturing of the soil aids in aerating the soil which is can be desired in extreme soil conditions, such as wet and/or clay soil. In some embodiments, at least one tine 30 is mounted to hub 32. In some embodiments, hub 32 is mounted to rail member 34 for rigidity. In some embodiments, hub 32 is adapted to rotate about first axis 36 (see FIG. 3) and it is this rotation that provides rotation of at least one tine 30 to interact with the soil. In some embodiments, rotation of hub 32 is achieved by movement of row unit assembly 10 through the field. In some embodiments, the pair of tine assemblies 20 forms a pair outer edges 38 of tilled row 40. In some embodiments, the ability to predetermine the pair of outer edges 38 generally optimizes the tilled row width 42 based on characteristics of the seed being planted. In general, the row width is within a range of six to twelve inches corresponding to crops, such as, soybean, wheat, and corn. In at least some embodiments, it is also beneficial to have at least one tine 30 fracture the soil at predetermine depth 44. In at least some embodiments, depth 44 is set based on the level of fracture needed and the depth of seed planting. Depending on the aggressiveness of soil fracture desired depth is generally less than or equal to six inches. In at least some embodiments, this range provides desired soil cultivation for seed planting without over fracturing the soil which in turn can overwhelm the row unit assembly causing premature wear of components and undesired soil contours for seed planting. In some embodiments, at least one tine 30 has outer diameter 46 generally centered with first axis 36. In some embodiments, a vertical plane 48 is defined at each of the pair of outer edges 38 of tilled row 40. In some embodiments, during operation at least one tine 30 is within a range of zero to four degrees with vertical plane 48. Typically, at zero degrees at least one tine 30 is in a generally parallel orientation with vertical plane 48.

In at least some embodiments, each of the pair of tine assemblies 20 has horizontal plane 50 defined with first axis 36. In many embodiments, during operation at least one tine 30 is generally within a range of zero to five degrees with the horizontal plane 50. Orientation of the pair of tine assemblies 20 about vertical plane 48 and horizontal plane, 50 adapts row unit assembly 10 to accommodate numerous different soil characteristics.

In at least some embodiments, each tine 30 has a centerline 52. In some embodiments involving multiple tines, a spacing between centerline 52 of one tine 30 and centerline 52 of another tine 30 is generally in the range of ten to twelve inches. As previously described, one tine 30 is can be used to fracture the soil. In some preferred embodiments, six tines are used for fracturing the soil.

Figure 3:
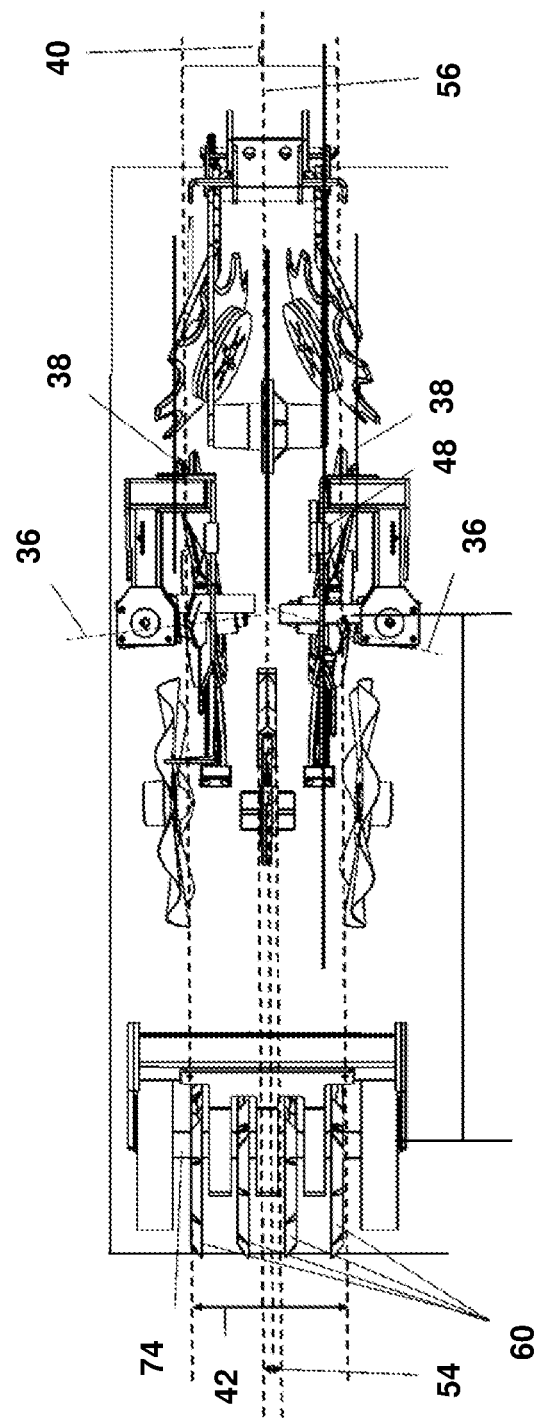
FIG. 3. is a top view of an agricultural row unit with some components hidden.

Referring to FIGS. 2 and 3, seedbed cultivator 22 is shown in one embodiment. In some embodiments, seedbed cultivator 22 works generally in tandem with the pair of tine assemblies 20 to form opening 54 in the soil that can be filled back in with tilled soil and ultimately with seed after planting. In some extreme soil conditions, such as wet and/or clay soil, working the soil can lead to smearing of opening 54 which can leave opening 54 to be in less than desired condition for seed planting. In some embodiments, seedbed cultivator 22 can be formed as a shank, disk or have a profile formed therein, such as, a wavy profile.

In some applications, chemical/fertilizer placement may be desired. In some of these applications, the fertilizer can be applied to the soil through an injector, tube or boot that is mounted to the seedbed cultivator.

In at least some embodiments, the ability to adapt row unit assembly 10 with the pair of tine assemblies 20 inhibits smearing of opening 54 with fracturing of the soil prior to pulling seedbed cultivator 22 through the soil. In some embodiments, tilled row 40 generally defines center axis 56. In some embodiments, center axis 56 is located in the center of tilled row 40 and coincident with seedbed cultivator 22 during operation for seed planting.

Referring to FIGS. 2 and 3, rolling cultivator 26 is shown in one embodiment. In some embodiments, rolling cultivator 26 provides final preparation of the soil for seed planting. In some embodiments, the soil that is fractured and/or ripped with the pair of tine assemblies 20 and seedbed cultivator 22 is directed towards center axis 56 and re-firming and suppressing air pockets in the soil by rolling cultivator 26.

In some embodiments, the rolling cultivator is used to flatten or slightly crown the cultivated soil for better seeding. In some embodiments, a set of fingers pushes the soil down to a generally flat to slightly crowned profile. In other or the same embodiments, other configurations can be used, such as, baskets, chains, angle iron, or bar stock.

In some embodiments, spider configuration 60 consisting of the set of fingers can be used. In some embodiments, such as tilling, spider configuration 60 can be configured to move the soil outwardly to avoid clogging of the equipment. Usage with the row unit assembly can adapt rolling cultivator 26 to direct a portion of the soil towards center axis 56 to better maintain the soil within the row 40.

Assembly of the rolling cultivator 26 being spider configuration 60 includes the set of fingers on one side of center axis 56 adapted to move soil towards center axis 56 and another set of fingers on the other side of center axis 56 in mirrored orientation to move soil towards center axis 56.

In some embodiments, rolling cultivator 26 is generally set at a depth to maximize soil condition for planting seed. In some embodiments, the rolling cultivator depth is generally in the range of one-half to three inches, based on known seed varieties. Generally, going to a deeper depth than seed planting depth provides greater resistance as the row unit assembly is moved through the field. In contrast, going to a less depth than seed depth provides less re-firming at the depth of seed planting causing possible growing disadvantages for the planted seed.

Based on standard field planting, rolling cultivators with a width of ten to eleven inches can be utilized to move through the field. This range provides needed treatment of the soil for seed propagation without the need to over-till the soil, as with other tilling. With rolling cultivator 26 adapted to provide the finished tilled row, it is important to have a set length between rolling cultivator 26 and first axis 36. In some embodiments, a range of thirty-nine to forty-two inches is appropriate for typical seed planting. This range generally provides enough distance for the soil that has been cultivated to be gathered in tilled row 40 before utilizing rolling cultivator 26.

Referring to FIGS. 2 and 3, pre-fracture coulter 18 is shown in one embodiment. In some embodiments, pre-fracture coulter 18 is a metal cutting disk that is adapted to cut through debris that are below ground level 62. Typical debris can be roots and/or stalks.

In some embodiments, pre-fracture coulter 18 is positioned relative to seedbed cultivator 22 to cut away debris prior to working the soil with seedbed cultivator 22. As such, in some embodiments, the pre-fracture coulter is positioned along center axis 56 forward of seedbed cultivator 22. In operation, the pre-fracture coulter defines soil fracture point 68. Soil fracture point is generally the point where pre-fracture coulter 18 meets ground level 62.

In some applications with extensive debris above ground level 62 the pair of row cleaners 16 can be utilized to remove the debris from tilled row 40.

The row cleaners can have an outer diameter 70. In an effort to benefit clearing of debris the pair of row cleaners 16 can be positioned relative to pre-fracture coulter 18. Positioning of the pair of row cleaners 16 generally corresponds with outer diameter 70 adjacent with soil fracture point 68. In some embodiments, the pair of row cleaners 16 has an angled mounting with center axis 56.

Referring to FIGS. 2 and 3, the pair of closing coulters 24 are shown according to one embodiment. In some embodiments, the pair of closing coulters 24 are positioned to aid in maintaining the soil that is fractured and ripped within the row that is tilled. In some embodiments, to enhance maintaining of soil that is fractured by the pair of tine assemblies 20, the pair of closing coulters are positioned generally outwardly to aid in retaining soil that can be kicked outwardly during fracturing of the soil.

In some embodiments, the pair of closing coulters 24 can be angled to better enhance movement of soil towards center axis 56 of tilled row 40. In some embodiments, the angle is within five degrees relative to center axis 56. In some embodiments, the pair of closing coulters 24 defines outer diameter 72. In at least some embodiments, outer diameter 72 in generally adjacent position with hub 32 of the pair of tine assemblies 20. In some embodiments, the pair of closing coulters 24 can be formed as a disk or have a profile formed therein, such as, a wavy profile.

Referring to FIGS. 2 and 3, the pair of gauge wheels 28 is shown according to one embodiment. As discussed previously, in some embodiments, there is a desire to maintain certain depths for fracturing, ripping, and cultivating the soil. One way of maintaining proper depths of components in operation is to set the depths based on sizing of the pair of gauge wheels 28. In some embodiments, the pair of gauge wheels 28 are mounted on shaft 74 used with rolling cultivator 26. In some embodiments, diameter 76 is chosen such the rolling cultivator 26 is placed at a desired depth for forming tilled row 40. In some embodiments, diameter 76 is in the range of eleven to twelve inches.

Referring to FIG. 2, row unit assembly 10 can be utilized for soil preparation for opportune planting. In at least some of these applications, as row unit assembly 10 is moved through the field, the pair of tine assemblies 20 forms the pair of outer edges 38 that generally corresponds with row width 42. In some embodiments, once the field has been tilled the row unit assembly can be replaced with a planter and the field can be tilled and seeded.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A row unit assembly for cultivating a row of soil, the assembly comprising:
   a prefracture coulter positioned along a center axis of the row unit assembly;
   a seedbed cultivator positioned along the center axis of the row unit assembly at a location aft of the prefracture coulter;
   a rolling cultivator positioned aft of both the prefracture coulter and the seedbed cultivator, the rolling cultivator rotating about a shaft, the shaft extending between first and second ends, and
   first and second gauge wheels, the first gauge wheel being coupled to the first end of the shaft and the second gauge wheel being coupled to the second end of the shaft.

2. The row unit assembly of claim 1, wherein the rolling cultivator forms a pair of spider configurations about the center axis of the row unit assembly.

3. The row unit assembly of claim 2, wherein the pair of spider configurations works soil towards the center axis of the row unit assembly.

4. The row unit assembly of claim 1, wherein the rolling cultivator is set at a depth corresponding to the planting of seed.

5. The row unit assembly of claim 1, wherein the rolling cultivator has a width in the range of 10" to 11".

6. The row unit assembly of claim 1, further comprising first and second closing coulters position forward of the rolling cultivator, with the first closing coulter being positioned along one side of the central axis of the row unit assembly and the second closing coulter being positioned along the other side of the central axis of the row unit assembly.

7. The row unit assembly of claim 6, wherein the first and second closing coulters are angled relative to the central axis of the row unit assembly.

8. The row unit assembly of claim 7, wherein each of the first and second closing coulters is angled relative to the central axis of the row unit assembly in a range of greater than zero degrees to 5 degrees.

9. The row unit assembly of claim 6, wherein the first and second closing coulters are positioned forward of the rolling cultivator and aft of the prefracture coulter.

10. The row unit assembly of claim 6, wherein the first closing coulter is positioned along one side of the seedbed cultivator and the second closing coulter is positioned along the other side of the seedbed cultivator.

11. The row unit assembly of claim 1, wherein the seed seedbed cultivator is a shank.

12. The row unit assembly of claim 1, wherein the seedbed cultivator is a disk.

13. The row unit assembly of claim 1, further comprising first and second row cleaners, the first row cleaner being positioned along one side of the prefracture coulter and the second row cleaner being positioned along the other side of the prefracture coulter.

14. The row unit assembly of claim 1, wherein the rolling cultivator includes one or more sets of fingers positioned along one side of the central axis of the row unit assembly and one or more sets of fingers positioned along the other side of the central axis of the row unit assembly.

* * * * *